UNITED STATES PATENT OFFICE.

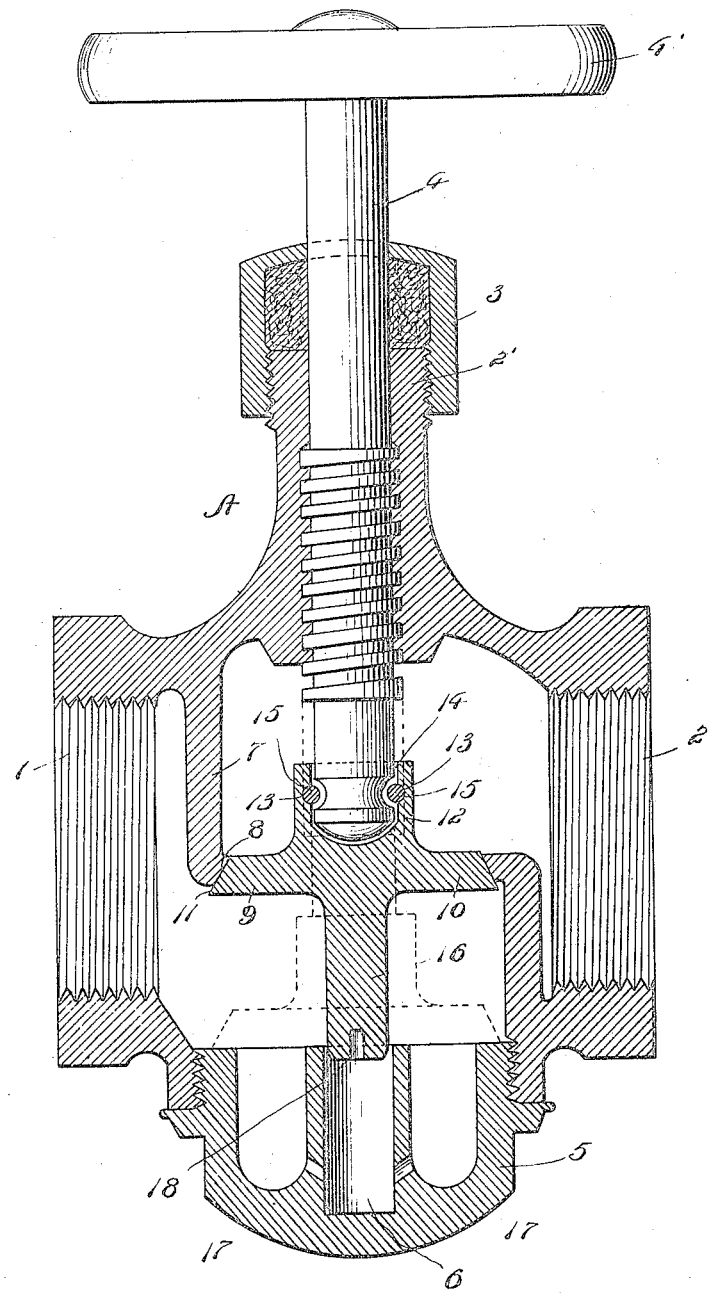

HENRY FROEHLICH, OF CENTRAL AGUIRRE, PORTO RICO.

VALVE.

1,092,035.

Specification of Letters Patent. Patented Mar. 31, 1914.

Application filed April 17, 1912. Serial No. 691,454.

*To all whom it may concern:*

Be it known that I, HENRY FROEHLICH, a citizen of the United States, residing at Central Aguirre, Guayama, Porto Rico, have invented new and useful Improvements in Valves, of which the following is a specification.

This invention relates to improvements in globe valves, and one of my main objects of the invention is to so construct a valve of this character, that steam can be admitted to press the valve disk against its seat so as to assure a fluid tight joint.

In carrying out my invention, it is also my aim to make this valve fool-proof against any disarrangement of construction between the valve disk and spindle, which danger will not allow the practice of having the pressure against the valve disk in the ordinary constructed valve now in use.

A further object of my invention is to have the valve when in open position entirely out of the way so as to permit free and unobstructed passage of the steam or fluid and to have the valve disk independently rotatably mounted on its spindle so that it may freely rotate on its movement toward and away from its seat, thus continually finding a new bearing in the valve seat to prevent leakage of the valve.

With these and other objects in view, which will appear from the following description, my invention also consists in certain novel and improved features of construction hereinafter more fully set forth.

In the accompanying drawing: the figure is a sectional side elevation illustrating the valve in a closed position, the open position of the valve being indicated by dotted lines.

Referring more particularly to the drawings, A designates the valve body or casing having an inlet and an outlet 1 and 2, respectively. The valve casing or body 1 is provided with a centrally bored, interiorly screw threaded nipple 2' having its upper end exteriorly screw threaded and adapted to receive the interiorly screw threaded cap 3, through which extends a spindle 4 having a screw threaded portion adjacent its lower end adapted to engage the interiorly threaded portion of the nipple 2', and provided at its upper end with a hand wheel 4', while the bottom of the said valve casing or body is fitted with a removable plug 5 which is formed to provide a centrally located, inwardly extending guide sleeve 6, the purpose of which will be more fully hereinafter described.

Arranged within the valve casing or body and formed integral therewith is a partition 7 disposed between the inlet and outlet and formed to provide a circular tapered passage 8, which forms a valve seat for the valve 9. The valve proper consists of a disk 10 having its periphery tapered as at 11 to correspond with the tapered passage or seat 8 formed in the partition 7 so as to provide an absolute fluid-tight joint when the valve is closed. The disk 10 is provided with a centrally arranged, upwardly extending boss 12 which is centrally bored to receive the lower end of the spindle 4. The interior diameter of the boss 12 is slightly greater than the diameter of the lower end of the spindle 4 to permit free and independent rotation of the valve proper thereon, pins 15 being passed transversely through the said boss and engaging the annular groove of the spindle 4 so as to operatively connect the valve with the spindle. The under side of the valve proper is provided with a circular stem 16 disposed in direct axial alinement with the spindle 4 and adapted to slide vertically within the guide sleeve 6 to retain the valve proper in exact center in its movement toward and away from the seat, the upper end of the said guide sleeve 6 and the plug 5 forming a rest or a support for the valve when in its open position.

The interior diameter of the guide sleeve 6 is slightly greater than the diameter of the stem 16 so as to permit the free and independent rotation of the valve proper upon its spindle, it being readily apparent that the valve proper, being free to rotate upon its spindle, constantly finds a new bearing against its seat on every closing operation and thereby prevents leakage of the valve by cutting grooves in the seat, which so often occurs when valves have a permanent bearing against their seats. The lower end of the guide sleeve 6 is provided with passages 17 arranged diametrically opposite each other and adapted to permit water of condensation or any other substance which might collect in the said sleeve while the valve is closed, to escape when the valve is moved down to an open position.

As shown in the drawing, it will be obvious that when the valve proper is moved down to an open position, the upper face of the valve being disposed slightly below the plane of the inner walls of the inlet and outlet openings of the casing, the valve will be so arranged to be entirely out of the way to permit a free and unobstructed passage for the steam or other fluid.

The lower end of the stem 16 is provided with a transverse slot 18 to permit the insertion of any suitable tool after the plug 5 has been removed, for the purpose of regrinding the valve when desired.

It is also evident that by having the valve and spindle relatively movable axially of the spindle that if the valve proper should fail to properly seat itself on limit of the upward movement of its spindle the steam pressure below the valve will force the said valve upwardly against its seat, and thus assure a perfectly fluid-tight joint.

From the foregoing description taken in connection with the accompanying drawing, the advantages of construction and operation will be readily apparent to those skilled in the art to which the invention appertains, and while I have shown the principle of operation together with my device, which I now consider the preferred form thereof, I desire to have it understood that the device shown is merely illustrative and that changes may be made when desired as are within the scope of the appended claim.

Having thus described my invention, I claim:

A valve of the class described, comprising a valve casing having an inlet and outlet, and a valve seat arranged therebetween, a valve movable toward and away from said seat and provided with a central depending valve stem, a removable plug closing the bottom of said casing and provided with an inwardly directed guide sleeve for said stem and terminating in a plane with the upper end of said plug and below the inner walls of said inlet and outlet passages forming a seat for the valve when in open position, said valve being movable downwardly to an open position and adapted to rest upon said sleeve and plug below the inner walls of the said inlet and outlet so as to permit a free and unobstructed passage for the steam or other fluid, and means for operating said valve.

In testimony whereof I affix my signature in presence of two witnesses.

HENRY FROEHLICH.

Witnesses:
  FRED L. WERNER,
  FRANCISCO ROSALY.